United States Patent
Oono

(10) Patent No.: US 9,964,812 B2
(45) Date of Patent: May 8, 2018

(54) LIQUID CRYSTAL DISPLAY DEVICE

(71) Applicant: Japan Display Inc., Minato-ku (JP)

(72) Inventor: Atsuko Oono, Saitama-ken (JP)

(73) Assignee: JAPAN DISPLAY INC., Minato-ku (JP)

( * ) Notice: Subject to any disclaimer, the term of this patent is extended or adjusted under 35 U.S.C. 154(b) by 0 days. days.

(21) Appl. No.: 15/493,993

(22) Filed: Apr. 21, 2017

(65) Prior Publication Data

US 2017/0227801 A1    Aug. 10, 2017

Related U.S. Application Data

(63) Continuation of application No. 15/182,254, filed on Jun. 14, 2016, now Pat. No. 9,651,830, which is a (Continued)

(30) Foreign Application Priority Data

Aug. 24, 2012  (JP) .................................. 2012-185055

(51) Int. Cl.
*G02F 1/1335* (2006.01)
*G02F 1/1339* (2006.01)
(Continued)

(52) U.S. Cl.
CPC .......... *G02F 1/1339* (2013.01); *G02F 1/1337* (2013.01); *G02F 1/1368* (2013.01);
(Continued)

(58) Field of Classification Search
CPC ..................... G02F 1/133514; G02F 1/133512
(Continued)

(56) References Cited

U.S. PATENT DOCUMENTS

2007/0165179 A1    7/2007  Jang
2009/0051859 A1    2/2009  Sugiyama
(Continued)

FOREIGN PATENT DOCUMENTS

JP    2001-337334 A    12/2001
JP    2002-40442 A    2/2002
(Continued)

OTHER PUBLICATIONS

Office Action dated Jun. 21, 2016 in Japanese Patent Application No. 2012-185055 (with English language translation).
(Continued)

*Primary Examiner* — Thanh-Nhan P Nguyen
(74) *Attorney, Agent, or Firm* — Oblon, McClelland, Maier & Neustadt, L.L.P.

(57) ABSTRACT

In a first substrate, a first organic insulating film is arranged in an active area, and includes a first surface and a first concave portion in a peripheral area outside the active area. The first concave portion is located more close to a substrate end side than the first surface. In a second substrate, a shield layer is arranged in the peripheral area facing the first substrate. A second organic insulating film includes a second surface facing the first surface and a second concave portion facing the first concave portion. The second organic insulating film overlaps the shield layer in the peripheral area. A pillar-shaped spacer is arranged between the first surface and the second surface in the peripheral area. A seal material contains the pillar-shaped spacer and is arranged between the first surface and the second surface, and between the first concave portion and the second concave portion.

12 Claims, 5 Drawing Sheets

Related U.S. Application Data continuation of application No. 14/930,328, filed on Nov. 2, 2015, now Pat. No. 9,423,655, which is a continuation of application No. 13/960,102, filed on Aug. 6, 2013, now Pat. No. 9,207,487.

(51) Int. Cl.
| | | |
|---|---|---|
| *G02F 1/1333* | (2006.01) | |
| *G02F 1/1337* | (2006.01) | |
| *G02F 1/1343* | (2006.01) | |
| *G02F 1/1362* | (2006.01) | |
| *G02F 1/1368* | (2006.01) | |

(52) U.S. Cl.
CPC ...... *G02F 1/13394* (2013.01); *G02F 1/13439* (2013.01); *G02F 1/133345* (2013.01); *G02F 1/133512* (2013.01); *G02F 1/133514* (2013.01); *G02F 1/133516* (2013.01); *G02F 1/134309* (2013.01); *G02F 1/136227* (2013.01); *G02F 2001/13685* (2013.01); *G02F 2001/133519* (2013.01); *G02F 2201/123* (2013.01); *G02F 2202/02* (2013.01); *G02F 2202/104* (2013.01)

(58) Field of Classification Search
USPC .................................................. 349/106, 110
See application file for complete search history.

(56) References Cited

U.S. PATENT DOCUMENTS

| | | | |
|---|---|---|---|
| 2010/0053512 | A1 | 3/2010 | Taniguchi et al. |
| 2011/0310336 | A1* | 12/2011 | Kobayashi .......... G02F 1/13394 349/106 |
| 2012/0033162 | A1 | 2/2012 | Ahn |
| 2013/0027645 | A1* | 1/2013 | Yamakawa ....... G02F 1/133514 349/106 |
| 2014/0055735 | A1 | 2/2014 | Oono et al. |
| 2014/0293207 | A1 | 10/2014 | Miyagi et al. |

FOREIGN PATENT DOCUMENTS

| | | |
|---|---|---|
| JP | 2004-029140 A | 1/2004 |
| JP | 2004-294799 | 10/2004 |
| JP | 2005-189595 A | 7/2005 |
| JP | 2008-158169 A | 7/2008 |
| JP | 2010-060619 A | 3/2010 |

OTHER PUBLICATIONS

Office Action dated Jan. 24, 2017 in Japanese Patent Application No. 2012-185055 (with English translation).

* cited by examiner

LIQUID CRYSTAL DISPLAY DEVICE

CROSS-REFERENCE TO RELATED APPLICATIONS

This application is a continuation of U.S. application Ser. No. 15/182,254 filed Jun. 14, 2016, which is a continuation of U.S. application Ser. No. 14/930,328 filed Nov. 2, 2015, which is a continuation of U.S. application Ser. No. 13/960,102 filed Aug. 6, 2013, and is based upon and claims the benefit of priority from prior Japanese Patent Application No. 2012-185055 filed Aug. 24, 2012, the entire contents of each of which are incorporated herein by reference.

FIELD

Embodiments described herein relate generally to a liquid crystal display device.

BACKGROUND

A liquid crystal display device is used in various fields of OA equipments such as a personal computer and a television set, taking advantage of the features such as light weight, thin shape, and low power consumption. In recent years, the liquid crystal display device is used also as displays for a portable remote terminal such as a cellular phone and PDA (personal digital assistant), a car navigation equipment, and a game machine.

In the liquid crystal display device, it is important to form a uniform cell gap, i.e., a uniform thickness of the liquid crystal layer held between a pair of substrates in an active area displaying images. In recent years, while selectively arranging pillar-shaped spacers on one substrate as a spacer for forming the cell gap, technology to form the spacer with sufficient accuracy in height is established, and the uniform cell gap is attained.

There is One Drop Fill (ODF) method as one of the technology for manufacturing the liquid crystal display device. According to the ODF method, an array substrate and a counter substrate are pasted together in a vacuum state after dropping liquid crystal materials in a region surrounded with a seal material on the array substrate or the counter substrate. In this method, the pair of substrates is pressed by a difference in the pressure between an inner region surrounded with the seal material and outside by returning to an atmospheric pressure state from the vacuum state, and the seal material is crushed. Thereby, a predetermined cell gap is formed. As the seal material applied to the One Drop Fill ODF method, ultraviolet curing type adhesives are used widely. However, since viscosity is high, the system which draws the seal material using a dispenser is adopted not by a printing method. The above ODF method has advantages, such as improvement in shortening of tact time, and efficient use of the material.

In recent years, in order to improve response characteristic, alignment characteristic, viewing angle characteristic, etc., of the liquid crystal display device, there is a tendency which narrows the cell gap. Moreover, request for reducing the external form size of the liquid crystal display device is increasing, and there is a tendency for the width of the seal material to become narrow according to the narrow frame. Such formation of the narrow cell gap and narrow frame results in reduction in the amount of application of the seal material.

The low amount application of the seal material is achieved by adjusting the pressure for extruding the seal material and the speed for drawing the seal material, etc. However, variation in the applied amount of the seal material is generated depending on the stability (circumference temperature) of the viscosity of the seal material because high velocity material is used. Furthermore, a defect such as a pattern cut is easily resulted in the process of the drawing due to a filler contained in the seal material.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
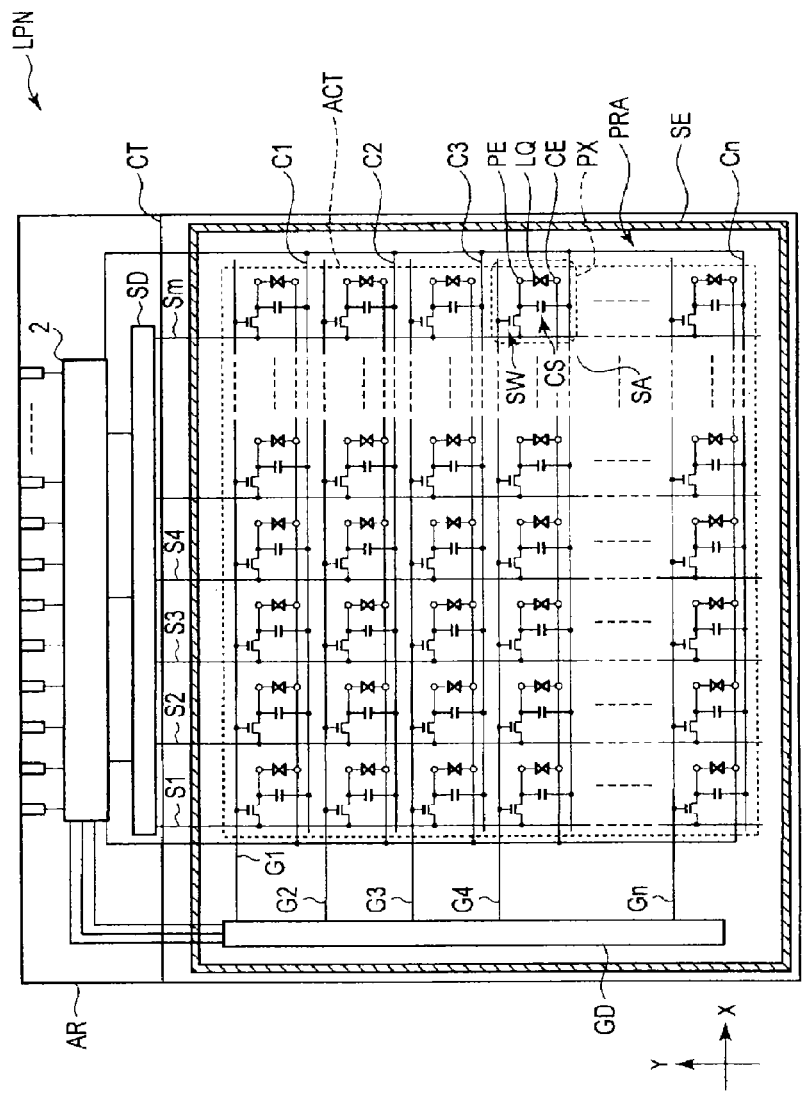
FIG. 1 is a view schematically showing a structure of a liquid crystal display panel and its equivalent circuit according to one embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a switching element arranged in an active area displaying images, a first organic insulating film arranged on the switching element in the active area, and including a first surface and a first concave portion in a peripheral area outside the active area, the first concave portion located more closing on a substrate end side than the first surface, and a pixel electrode electrically connected with the switching element in the active area, a second substrate including; a shield layer arranged in the peripheral area facing the first substrate, and a second organic insulating film including a second surface facing the first surface and a second concave portion facing the first concave portion, the second organic insulating film overlapping the shield layer in the peripheral area, a pillar-shaped spacer arranged between the first surface and the second surface in the peripheral area; a seal material for pasting the first substrate and the second substrate, containing the pillar-shaped spacer and arranged between the first surface and the second surface, and between the first concave portion and the second concave portion; and a liquid crystal layer held between the first substrate and the second substrate in the inside surrounded with the seal material.

FIG. 1 is a view schematically showing a structure of a liquid crystal display panel and its equivalent circuit according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The array substrate AR and the counter substrate CT are pasted, for example, by a seal element SE without being disconnected in the shape of a closed loop. That is, the seal element is formed in a frame of a rectangular shape.

The liquid crystal display panel LPN includes an active area ACT for displaying images surrounded with the seal material SE. The seal material SE is arranged in a peripheral area outside of the active area ACT. The active area ACT is constituted by a plurality of pixels PX arranged in the shape of a (m×n) matrix (here, "m" and "n" are positive integers).

The array substrate AR includes a plurality of gate lines G (G1-Gn) and auxiliary capacitance lines C (C1-Cn) extending along a first direction X in the active area ACT, respectively, a plurality of source lines S (S1-Sm) extending along a second direction Y that orthogonally crosses in the first direction X, respectively, a switching element SW connected with the gate line G and the source line S in each pixel PX, a pixel electrode PE electrically connected with the switching element SW in each pixel PX. The pixel electrode PE is formed in the shape of an island in each pixel PX.

The counter substrate CT includes a common electrode CE facing the pixel electrode PE each other through a liquid crystal layer LQ in each pixel PX. The common electrode CE is formed in common over the plurality of pixels PX.

Each gate line G is pulled out to outside of the active area ACT and connected to a gate driver GD. Each source line S is pulled out to the outside of the active area ACT and connected to a source driver SD. At least a portion of the gate driver GD and the source driver SD is formed in the array substrate AR, for example, and the gate driver GD and the source driver SD are connected with a driver IC chip 2 provided in the array substrate AR and having an implemented controller. In the illustrated example, the drive IC chip 2 as a signal source required to drive the liquid crystal display panel LPN is mounted on the array substrate AR outside of the active area ACT of the liquid crystal display panel LPN. An auxiliary capacitance voltage is supplied to each auxiliary capacitance line from the driver IC chip 2. A common voltage is impressed to the common electrode CE from the driver IC chip 2.

The liquid crystal display panel LPN according to the embodiment is constituted so that modes mainly using a vertical mode such as a TN (Twisted Nematic) mode, an OCB (Optically Compensated Bend) mode, and a VA (Vertical Aligned) mode are applied. However, modes mainly using lateral electric field such as IPS (In-Plane Switching) mode and FFS (Fringe Field Switching) mode may be applied. In the liquid crystal display panel LPN using the lateral electric field, the array substrate AR is equipped with both of the pixel electrode PE and the common electrode CE.

Figure 2:
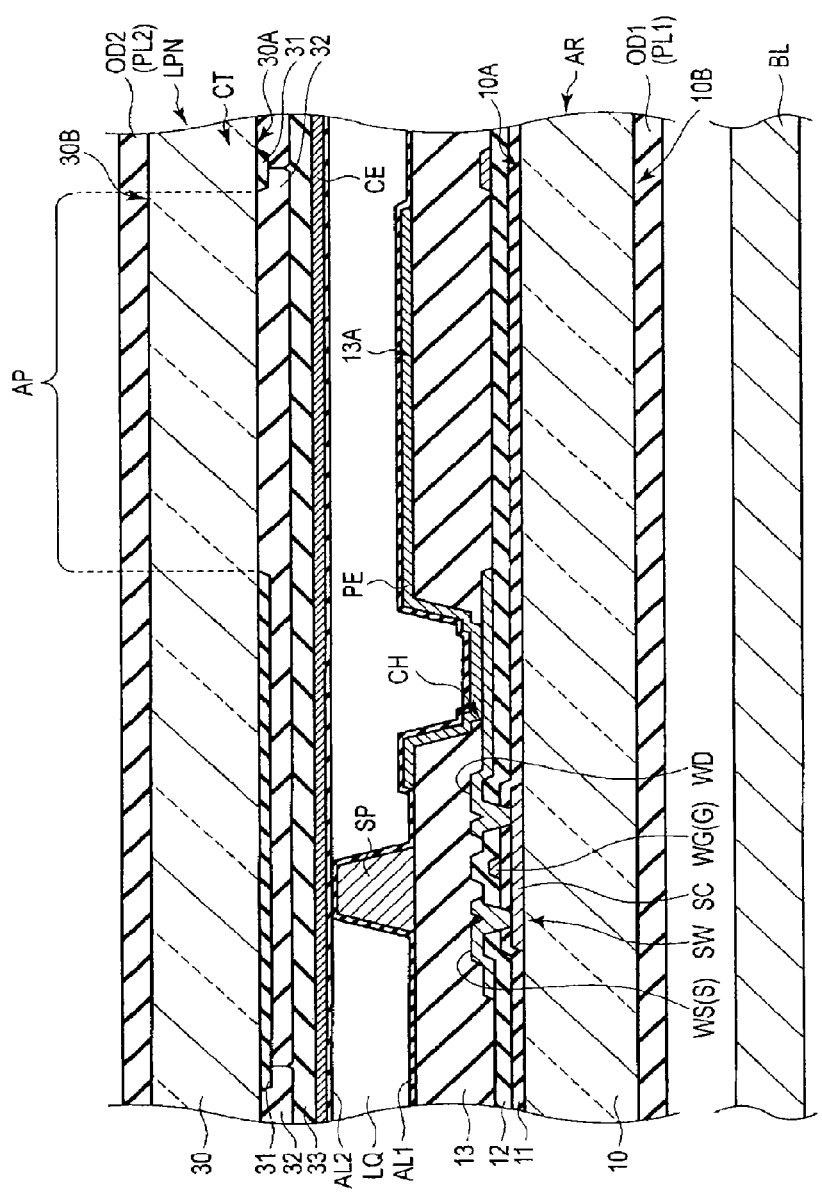
FIG. 2 is a cross-sectional view schematically showing the structure of the liquid crystal display panel including a switching element in one pixel shown in FIG. 1.

FIG. 2 is a cross-sectional view schematically showing the structure of the liquid crystal display panel LPN shown in FIG. 1 including a switching element in one pixel PX. Here, the cross-sectional view of the structure of the liquid crystal display panel LPN in the mode using the vertical electric field is explained as one example.

The array substrate AR is formed using a first insulating substrate 10 formed of a glass substrate, a plastic substrate, etc., which have transmissive characteristics. The array substrate AR includes the switching element SW, the pixel electrode PE, a first insulating film 11, a second insulating film 12, a third insulating film 13, and a first alignment film AL1, a pillar shaped spacer SP, etc., on the first insulating substrate 10 facing the counter substrate CT.

The switching element SW shown here is a thin film transistor (TFT), for example. Although the switching element SW may be either of a top-gated type or a bottom gated-type, the top-gated type is used in this embodiment. The switching element SW is equipped with a semiconductor layer SC arranged on the first insulating substrate 10. Though the semiconductor layer SC may be formed with poly-silicon, amorphous silicon, oxide semiconductor, etc., the poly-silicon is used in this embodiment. In addition, an undercoat layer formed of an insulating film may be arranged between the first insulating substrate 10 and the semiconductor layer SC. The semiconductor layer SC is covered with the first insulating film 11. Moreover, the first insulating film 11 is arranged also on the first insulating substrate 10.

A gate electrode WG of the switching element SW is formed on the first insulating film 11 and located right above the semiconductor layer SC. The gate electrode WG is electrically connected with the gate line G or integrally formed. The gate line G including the gate electrode WG is covered with the second insulating film 12. Moreover, the second insulating film 12 is arranged also on the first insulating film 11. The first insulating films 11 and the second insulating film 12 are formed of inorganic system materials, such as a silicon oxide (SiOx), for example.

A source electrode WS and a drain electrode WD of the switching element SW are formed on the second insulating film 12. The source electrode WS is electrically connected with the source line S or integrally formed with the source line S. The drain electrode WD is arranged apart from the source line S. The source electrode WS and the drain electrode WD are in contact with the semiconductor layer SC through a contact hole which penetrates the first insulating film 11 and the second insulating film 12, respectively. The source line S including the source electrode WS and the drain electrode WD are covered with the third insulating film 13. The third insulating film 13 is arranged on the switching element SW. The third insulating film 13 is arranged also on the second insulating film 12. A contact hole CH which penetrates to the drain electrode WD is formed in the third insulating film 13. The third insulating film 13 corresponds to a first organic insulating film formed of resin material, for example. The first insulating film 11, the second insulating film 12, and the third insulating film 13 extend to the peripheral area not only in the active area.

The pixel electrode PE is formed on the third insulating film 13. In this embodiment, the pixel electrode PE is formed on a first surface 13A of the third insulating film 13, and in contact with the drain electrode WD through the contact hole CH. The pixel electrode PE is formed of transparent electric conductive materials, such as Indium Tin oxide (ITO) and Indium Zinc Oxide (IZO), for example. The pixel electrode PE is covered with the first alignment film AL1.

The pillar-shaped spacer SP is formed on the third insulating film 13, and covered with the first alignment film AL1. The pillar-shaped spacer SP is formed of, for example, resin material.

On the other hand, the counter substrate CT is formed using a second insulating substrate 30 such as a glass substrate, a plastic substrate, etc., which has transmissive characteristics. The counter substrate CT includes a shield layer 31, a color filter 32, an overcoat layer 33, a common electrode CE and a second alignment film AL2, etc., on the second insulating substrate 30 facing the array substrate AR.

The shield 31 defines each pixel PX in the active area ACT, forms an aperture portion AP, and counters wiring portions such as the gate line G, the source line S, and the switching element SW formed in the array substrate AR.

The color filter 32 is formed in the aperture portion AP, and a portion thereof runs on the black matrix 31. The colors of the color filters 32 arranged in the adjoining pixels PX in the first direction X differ mutually. For example, the color filters 32 are formed of resin materials colored by three primary colors of red, blue, and green, respectively. The red color filter formed of resin material colored in red is arranged corresponding to the red pixel. The blue color filter formed of resin material colored in blue is arranged corresponding to the blue pixel. The green color filter formed of resin material colored in green is arranged corresponding to the green pixel. The boundary between the adjoining color filters 32 is located in a position which overlaps with the black matrix 31.

The overcoat layer 33 covers the color filter 32. The overcoat layer 33 eases influence by unevenness of the shield layer 31 and the surface of the color filter 32. For example, the overcoat layer 33 is formed of a transparent resin. At least one of the color filters 32, for example, the blue color filter extends not only in the active area but to the peripheral area.

The common electrode CE is formed on the overcoat layer 33 facing the array substrate AR. The common electrode CE is formed of transparent electric conductive material, for example, ITO, IZO, etc. The common electrode CE is covered with the second alignment film AL2.

The array substrate AR and the counter substrate CT as mentioned above are arranged so that respective first alignment film AL1 and second alignment film AL2 face each other. At this time, a predetermined cell gap is integrally formed with the pillar-shaped spacer arranged between the array substrate AR and the counter substrate CT. The array substrate AR and the counter substrate CT are pasted together by seal material so as to form the cell gap. The liquid crystal layer LQ is constituted by liquid crystal composite containing liquid crystal molecules enclosed in the cell gap formed between the first alignment film AL1 on the array substrate AR, and the second alignment film AL2 on the counter substrate CT.

A first optical element OD1 having a first polarization plate PL1 is arranged on the external surface 10B of the array substrate AR, i.e., the external surface of the first insulating substrate 10. Moreover, a second optical element OD2 having a second polarization plate PL2 is arranged on the external surface 30B of the counter substrate CT, i.e., an external surface of the second insulating substrate 30.

A backlight BL is arranged on the back side of the array substrate AR in the illustrated liquid crystal display panel LPN. Various types of backlights BL can be used. For example, a light emitting diode (LED) and a cold cathode fluorescent lamp (CCFL), etc., can be applied as a light source of the backlight BL, and the explanation about its detailed structure is omitted.

Figure 3:
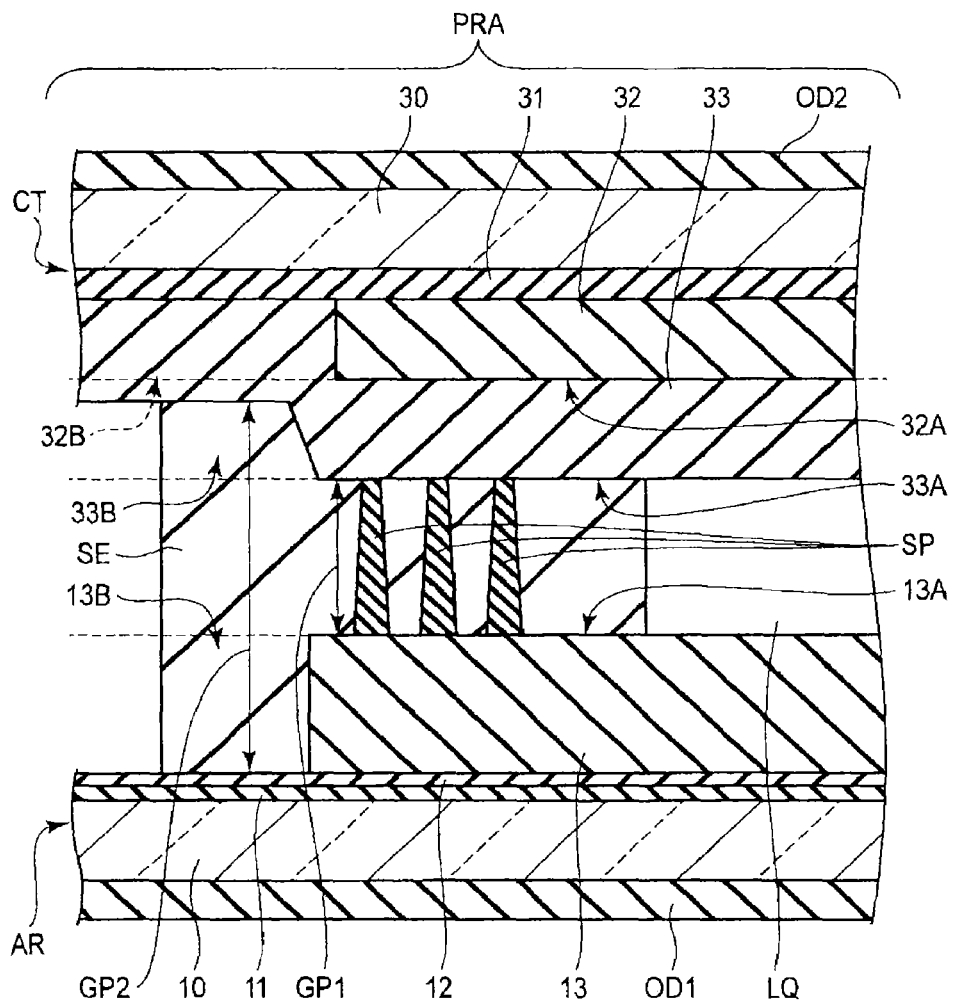
FIG. 3 is a view schematically showing a cross-sectional structure in a peripheral area according to the embodiment.

FIG. 3 is a view schematically showing a cross-sectional structure in the peripheral area according to the embodiment.

In the array substrate AR, the first insulating film 11, the second insulating film 12, and the third insulating film 13 are arranged also in the peripheral area PRA. Although not illustrated, the first insulating film 11 and the second insulating film 12 extend up to the end of the first insulating substrate 10.

The third insulating film 13 is arranged on the second insulating film 12 in the peripheral area PRA, and includes a first substantially flat surface 13A. Moreover, the third insulating film 13 includes a first concave portion 13B depressed from the first surface 13A. The first concave portion 13B is located outside the first surface 13A, i.e., on the substrate end side.

In this embodiment, the first concave portion 13B penetrates to the second insulating film 12. That is, the second insulating film 12 located in the peripheral area PRA is exposed from the third insulating film 13 in the first concave portion 13B. In addition, the first concave portion 13B may be formed in the shape of a continuous slot in a normal direction of this paper or may be formed partially. The third insulating film 13 forms a step between the first surface 13A and the first concave portion 13B in the peripheral area PRA.

In the counter substrate CT, the shield layer 31, the color filter 32, and the overcoat layer 33 are arranged in the peripheral area PRA. Although not illustrated, the shield layer 31 extends up to the substrate end of the second insulating substrate 30. The color filter 32 and the overcoat layer 33 correspond to a second organic insulating film which overlaps with the shield layer 31 in the peripheral area PRA, and includes a second surface 33A facing the first surface 13A, and a second concave portion 33B facing the first concave portion 13B.

In this embodiment, the color filter 32 overlaps with the shield layer 31 in a position facing the first surface 13A in the peripheral area PRA, and includes a substantially flat surface 32A. Moreover, the color filter 32 exposes the shield layer 31 in a position facing the first concave portion 13B. That is, the color filter 32 includes a concave portion 32B penetrating to the shield layer 31 in a position which faces the first concave portion 13B. The step between the surface 32A and the concave portion 32B corresponds to the film thickness (for example, 1-3 μm) of the color filter 32. Although the color filter 32 arranged in the peripheral area PRA is formed of resin material colored in blue, for example, the color filter 32 may be formed of the resin material colored in other colors.

The overcoat layer 33 covers the color filter 32, and moreover, covers the shield layer 31 exposed from the color filter 32. That is, the overcoat layer 33 overlaps with the surface 32A of the color filter 32 in a position facing the first surface 13A. Furthermore, the overcoat layer 33 extends to the concave portion 32B of the color filter 32 and overlaps with the shield layer 31. Thereby, the overcoat layer 33 forms a second substantially flat surface 33A in a position facing the first surface 13A. Furthermore, the overcoat layer 33 forms a second concave portion 33B in a position facing the first concave portion 13B depressed from the second surface 33A. The step between the second surface 33A and the second concave portion 33B is formed according to the step of the color filter 32.

The pillar-shaped spacer SP is arranged not only in the above-mentioned active area but in the peripheral area PRA. That is, in the peripheral area PRA, the pillar-shaped spacer SP is arranged between the first surface 13A and the second surface 33A. When forming the pillar-shaped spacer SP in the array substrate AR, the pillar-shaped spacer SP is arranged on the first surface 13A of the third insulating film 13, and formed in the shape of a taper which becomes thinner toward the counter substrate CT. The shield layer 31, the color filter 32, and the overcoat layer 33 are laminated above the pillar-shaped spacer SP.

In this embodiment, the pillar-shaped spacer SP contacts the second surface 33A, and supports the counter substrate CT. At this time, a first cell gap GP1 is formed between the first surface 13A and the second surface 33A, and a second cell gap GP2 larger than the first cell gap GP1 is formed between the first concave portion 13B and the second concave portion 33B. That is, a region having the larger second cell gap GP2 is formed in the outside of the region in which the first cell gap GP1 is formed. In addition, the first cell gap GP1 is formed over the area (including the active area) in which the liquid crystal layer LQ is held.

The seal material SE contains the pillar-shaped spacer SP, and is arranged between the first surface 13A and the second surface 33A and between the first concave portion 13B and the second concave portion 33B. The seal material SE pastes the array substrate AR and the counter substrate CT together. That is, the seal material SE is arranged between the substrates with the comparatively small first cell gap GP1 on the liquid crystal layer LQ side, and arranged between the substrates with the comparatively large second cell gap GP2 on the substrate end side.

In addition, when the seal material SE contains a filler such as a silica (SiO2) other than adhesives, the filler and adhesives may invade between the pillar-shaped spacer SP and the second surface 33A. That is, the pillar-shaped spacer SP is not necessarily in contact with the second surface 33A.

In the region of the peripheral area PRA to which the seal material SE is applied according to this embodiment, the array substrate AR includes the first surface 13A and the first concave portion 13B, and the counter substrate CT includes the second surface 33A facing the first surface 13A and the second concave portion 33B facing the first concave portion 13B. The pillar-shaped spacer SP is arranged between the first surface 13A and the second surface 33A, and forms the cell gap substantially equal to that in the active area ACT. On the other hand, the seal material SE is arranged, respectively, between the first surface 13A and the second surface 33A, and between the first concave portion 13B and the second concave portion 33B. For this reason, it becomes possible to expand the cross-section area of the region in which the seal material SE is applied as compared with the structure in which the first concave portion 13B and the second concave portion 33B are not formed. Therefore, it becomes possible to increase the applied amount of the seal material SE, while satisfying the demand for the formation of the narrow cell gap and the narrow frame. Thereby, the amount of the applied seal material SE is stable, and it becomes possible to control such defect as a pattern cut. For this reason, it becomes possible to control the decrease in the manufacturing yield.

Moreover, since the seal the material SE contacts the step between the first surface 13A and the first concave portion 13B, and the step between the second surface 33A and the second concave portion 33B, it becomes possible to expand both of the contact areas between the seal material SE and the array substrate AR, and between the seal material SE and the counter substrate CT. Therefore, it becomes possible to raise the strength which pastes the array substrate AR and the counter substrate CT together with increase in the applied amount of the seal material SE, and the expansion of the contact area of the seal material SE.

Moreover, the first concave portion 13B and the second concave portion 33B are located outside the first surface 13A and the second surface 33A, i.e., on the opposite side to the region in which the liquid crystal layer, LQ is held. For this reason, when the array substrate AR and the counter substrate CT are pasted together after applying the seal material SE, spread of the seal material SE on the substrate end side can be controlled, and narrow frame is obtained. Moreover, when a plurality of liquid crystal display panels is cut down from a large-sized mother substrate, it becomes possible to control protrusion into cutting lines and also to suppress the generation of wrong cutting.

Figure 4:
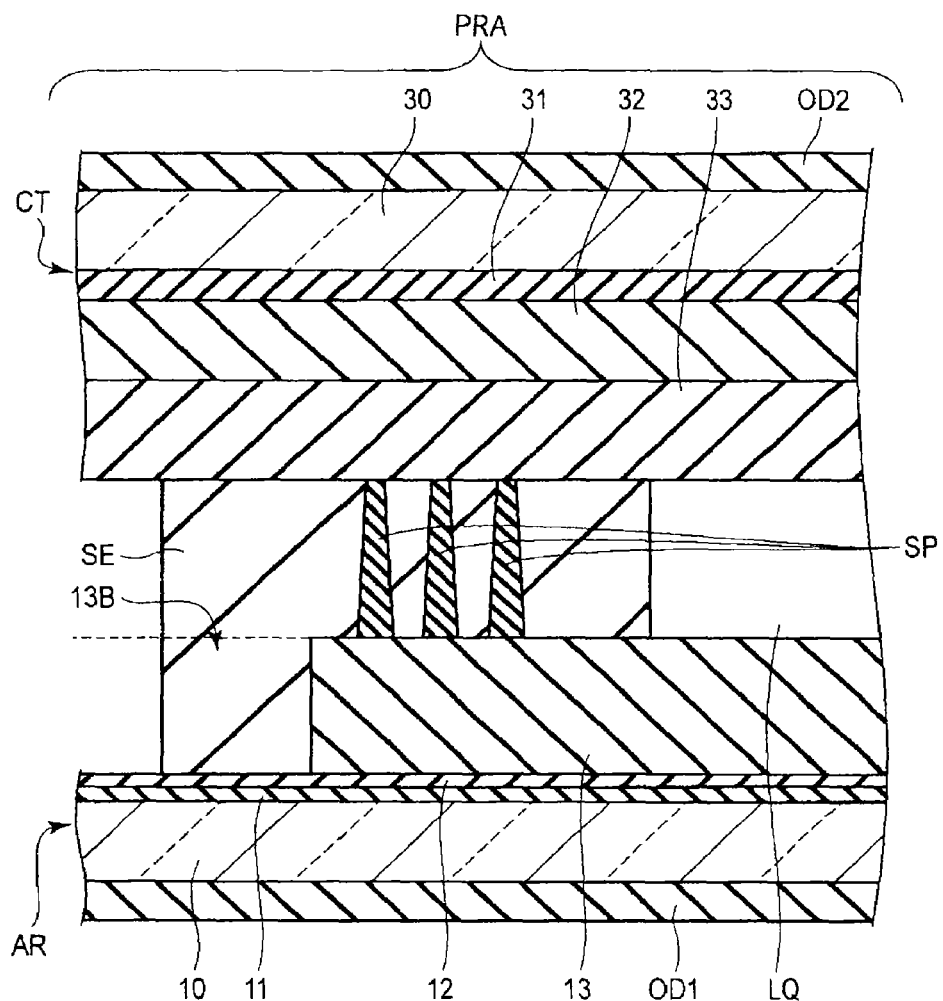
FIG. 4 is a view schematically showing a cross-sectional structure in the peripheral area according to a comparative example.

Next, the effect according to this embodiment is explained referring to a comparative example. FIG. 4 is a view schematically showing a cross-sectional structure in the peripheral area according to a comparative example.

In this comparative example, while the array substrate AR includes the first concave portion 13A, the counter substrate CT does not include the second concave portion facing the first concave portion 13B. In the comparative example, the cross-sectional area of the region where the seal material SE is applied is 2000 µm$^2$, for example.

On the other hand, according to this embodiment, the counter substrate CT includes the second concave portion 33B. Here, an example of the size of the second concave portion 33B is described. For example, the step between the second surface 33A and the second concave portion 33B is 1.5 µm, and the applied cross-sectional area of the seal material SE becomes 2400 µm$^2$. For this reason, according to this embodiment, the applied amount of the seal material SE was able to increase by approximately 20% comparing to the comparative example. In this embodiment, the pattern cutting of the seal material SE was not generated.

Figure 5:
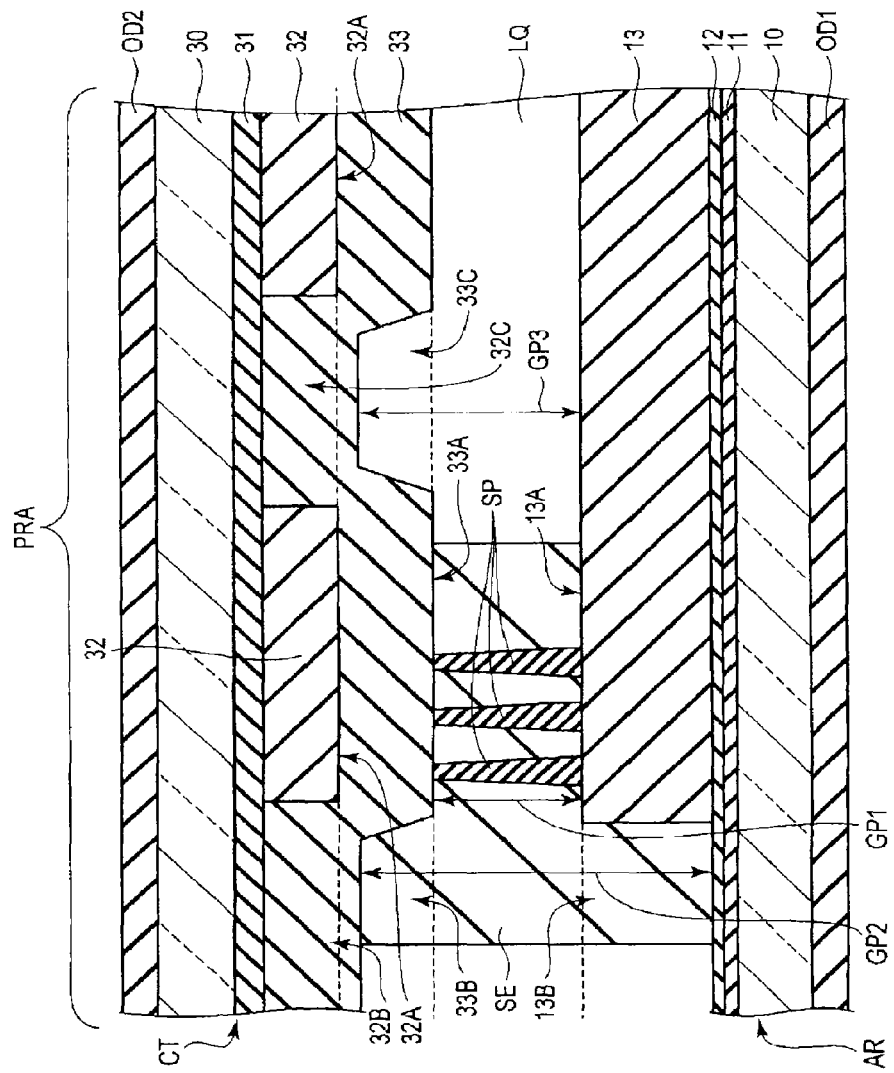
FIG. 5 is a view schematically showing a cross-sectional structure in the peripheral area according to a second embodiment.

FIG. 5 is a view schematically showing a cross-sectional structure in the peripheral area according to a second embodiment.

This second embodiment shown here is different from the first embodiment shown in FIG. 3 in that the counter substrate CT includes a third concave portion 33C facing the organic insulating film 13 in an inner region surrounded with the seal material SE in the peripheral area PRA.

That is, the color filter 32 includes the substantially flat surface 32A, the concave portion 32B facing the first concave portion 13B and a concave portion 32C facing the first surface 13A in the counter substrate CT of the peripheral area PRA. That is, while the color filter 32 is formed in the position which overlaps with the pillar-shaped spacer SP in the peripheral area PRA, the color filter 32 includes the concave portion 32B and the concave portion 32C in the both sides sandwiching the pillar-shaped spacer SP, respectively. The concave portion 32B and the third concave portion 32C penetrate to the shield layer 31.

The overcoat layer 33 covers the color filter 32, and moreover, covers the shield layer 31 exposed from the color filter 32. That is, the overcoat layer 33 overlaps with the surface 32A of the color filter 32 in a position facing the first surface 13A, and extends to the concave portion 32B of the color filter 32 so as to overlap with the shield layer 31 in a position facing the first concave portion 13B. Moreover, the overcoat layer 33 extends to the concave portion 32C of the color filter 32 and overlaps with the shield layer 31 in a position facing the first surface 13A. Thereby, the overcoat layer 33 forms the substantially flat second surface 33A in a position facing the first surface 13A. Moreover, the overcoat layer 33 forms the second concave portion 33B depressed from the second surface 33A in a position facing the first concave portion 13B. Similarly, the overcoat layer 33 forms a third concave portion 33C depressed from the second surface 33A in a position facing the first surface 13A.

The pillar-shaped spacer SP is arranged between the first surface 13A and the second surface 33A. At this time, the first cell gap GP1 is formed between the first surface 13A and the second surface 33A, the second cell gap GP2 larger than the first cell gap GP1 is formed between the first concave portion 13B and the second concave portion 33B, and the third cell gap GP3 larger than the first cell gap GP1 and smaller than the second cell gap GP2 is formed between the first surface 13A and the third concave portion 33C.

The seal material SE includes the pillar-shaped spacer SP, and is arranged between the first surface 13A and the second surface 33A, and between the first concave portion 13B and the second concave portion 33B. The liquid crystal layer LQ is held on the inner side surrounded with the seal material SE.

Also in the second embodiment, the same effect as the first embodiment shown in FIG. 3 is obtained.

In addition, the third concave portion 33C is formed inside the seal material SE by which the liquid crystal layer LQ is held in the peripheral area PRA which does not contribute to an image display. The region with the third cell gap GP3 larger than the first cell gap GP1 is formed. Accordingly, even if air bubbles are generated in the liquid crystal layer LQ, it becomes possible to collect the air bubbles in the third concave portion 33C. When the ODF method is especially applied as a manufacturing method of the liquid crystal display panel LPN, if the dropped amount of the liquid crystal material is scant, it is easy to generate the air bubbles (low-temperature air bubbles) in the liquid crystal layer LQ due to a shock applied from the exterior. It is not permitted that such air bubbles exist in the active area ACT because the air bubbles cause the decrease in the manufacturing yield. However, it becomes possible to control the decrease in the manufacturing yield by collecting the air bubbles in the third concave portion 33C that does not contribute to the display. Moreover, when the ODF method is applied, even if the dropped amount of the liquid crystal materials is superfluous, it becomes possible to accommodate the surplus of the liquid crystal materials in the region in which the third cell gap GP3 is formed, and to control the variation in the cell gap in the active area resulting from the variation in the dropped amount. Accordingly, it becomes possible to control generation of degradation of the display grace.

As explained above, according to the embodiments, the liquid crystal display device which can control the fall of the manufacturing yield can be supplied.

In the above embodiment, the seal material is arranged on one substrate without break so as to surround the active area, and the pair of substrates is pasted after the liquid crystal materials were dropped by the ODF method. However, the structures are not restricted to the above embodiments. For example, while the seal material with injecting holes is arranged so as to surround the active area, the pair of substrates may be pasted together using a vacuum injecting method.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A display device, comprising:
    a first substrate including:
        a first insulating substrate,
        a light shielding layer on the first insulating substrate in a peripheral area arranged around a display area displaying an image,
        a color filter layer on the light shielding layer in the peripheral area, and
        an overcoat layer in the peripheral area;
    wherein
    the color filter layer includes a first portion and a second portion in the peripheral area,
    the first portion and the second portion are separated by an interval region,
    the overcoat layer covers the first portion, the second portion, and the interval region between the first portion and the second portion,
    the overcoat layer contacts the light shielding layer in the interval region,
    the first portion is located at a first substrate edge side,
    the second portion is located closer to a display area side than the first portion,
    the overcoat layer has a surface on an opposite side to the light shielding layer,
    a height of the surface of the overcoat layer from the light shielding layer in a first region having the first portion is greater than a height of the surface of the overcoat layer from the light shielding layer in the interval region,
    a height of the surface of the overcoat layer from the first insulating substrate in the first region having the first portion and a height of the surface of the overcoat layer from the first insulating substrate in a second region having the second portion are substantially same, and
    the overcoat layer contacts the light shielding layer in a third region closer to the first substrate edge side than the first portion.

2. The display device according to claim 1, wherein the first portion and the second portion are adjacent to each other, and a thickness of the first portion and a thickness of the second portion are substantially same.

3. The display device according to claim 1, wherein a thickness of the overcoat layer is substantially same in the interval region and in the third region.

4. The display device according to claim 1, wherein a thickness of the overcoat layer is substantially same in the first region having the first portion and in the second region having the second portion.

5. The display device according to claim 1, further comprising:
    a second substrate including:
        a second insulating substrate,
        an inorganic layer on the second insulating substrate, and
        an organic layer on the inorganic layer including an upper surface and a side surface in the peripheral area;
    wherein
    the upper surface of the organic layer opposes the first portion, the second portion, and the interval region,
    the side surface of the organic layer opposes the third region.

6. The display device according to claim 5, wherein the inorganic layer is exposed from the organic layer in the third region.

7. The display device according to claim 1, further comprising:
    a second substrate including:
        a second insulating substrate, an inorganic layer on the second insulating substrate, and an organic layer on the inorganic layer including an upper surface and a side surface in the peripheral area;

wherein the upper surface of the organic layer faces the first portion, the second portion, and the interval region, the side surface of the organic layer faces the third region.

8. The display device according to claim 7, wherein the inorganic layer is exposed from the organic layer in the third region.

9. The display device according to claim 1, further comprising:

a second substrate including:

a second insulating substrate, an inorganic layer on the second insulating substrate, and an organic layer on the inorganic layer including an upper surface and a side surface in the peripheral area;

wherein the upper surface of the organic layer overlaps the first portion, the second portion, and the interval region, the side surface of the organic layer overlaps the third region.

10. The display device according to claim 9, wherein the inorganic layer is exposed from the organic layer in the third region.

11. The display device according to claim 1, further comprising a first spacer and a second spacer, wherein the first portion overlaps the first spacer and the second spacer.

12. The display device according to claim 11, further comprising a seal material surrounding the first spacer and the second spacer, wherein the seal material is located between the first spacer and the second spacer.

* * * * *